(12) United States Patent
Zhao et al.

(10) Patent No.: US 12,474,375 B2
(45) Date of Patent: Nov. 18, 2025

(54) EEG IMPEDANCE TEST CIRCUIT, METHOD, AND DEVICE

(71) Applicant: KINGFAR INTERNATIONAL INC., Beijing (CN)

(72) Inventors: Qichao Zhao, Beijing (CN); Ran Yang, Beijing (CN); Zhao Li, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 566 days.

(21) Appl. No.: 18/088,945

(22) Filed: Dec. 27, 2022

(65) Prior Publication Data

US 2024/0053385 A1 Feb. 15, 2024

(30) Foreign Application Priority Data

Aug. 12, 2022 (CN) .......................... 202210972024.8

(51) Int. Cl.
*G01R 1/30* (2006.01)
*A61B 5/00* (2006.01)
(Continued)

(52) U.S. Cl.
CPC ................ *G01R 1/30* (2013.01); *A61B 5/369* (2021.01); *A61B 5/386* (2021.01); *A61B 5/6843* (2013.01); *A61B 2560/0276* (2013.01)

(58) Field of Classification Search
CPC .......... G01R 1/30; G01R 27/02; A61B 5/369; A61B 5/6843; A61B 2560/0276
See application file for complete search history.

(56) References Cited

U.S. PATENT DOCUMENTS 3,802,419 A     4/1974   Yates
4,240,443 A * 12/1980   Ionescu .................. A61B 5/307
                                                                               128/902
(Continued)

FOREIGN PATENT DOCUMENTS

AU      2002233052 B2    9/2002
CN      103592517 A      2/2014
(Continued)

OTHER PUBLICATIONS

Dongming Li; Jiahui Wu; Yueming Gao; Min Du; Željka Lučev Vasić; Mario Cifrek—A Differential Analog Receiver Front-End for Galvanic-Coupled Human Body Communication (Year: 2020).*
(Continued)

*Primary Examiner* — Farhana A Hoque
*Assistant Examiner* — Joseph O Nyamogo
(74) *Attorney, Agent, or Firm* — Cooper Legal Group, LLC

(57) ABSTRACT

Disclosed are an EEG impedance test circuit, a method, and a device. The circuit comprises a frequency selecting circuit, an amplification circuit, a follower circuit, and a power supply terminal AVCC. An input end of the frequency selecting circuit is connected to the power supply terminal AVCC, the input end of the frequency selecting circuit is further connected to the input end of the amplification circuit, an output end of the frequency selecting circuit is connected to the output end of the amplification circuit, and the output end of the amplification circuit is connected to the input end of the follower circuit; the frequency selecting circuit is configured for oscillating so as to generate an oscillation signal; and the follower circuit is configured for isolating the frequency selecting circuit and the amplification circuit; the follower circuit is configured for circuit isolation.

10 Claims, 2 Drawing Sheets

(51) Int. Cl.
  *A61B 5/369* (2021.01)
  *A61B 5/386* (2021.01)

(56) References Cited

U.S. PATENT DOCUMENTS

| | | | | |
|---|---|---|---|---|
| 4,417,590 A | * | 11/1983 | Smith | A61B 5/369 600/544 |
| 2006/0111645 A1 | * | 5/2006 | Petrucelli | A61B 5/053 600/547 |
| 2007/0078324 A1 | * | 4/2007 | Wijisiriwardana | A61B 5/389 600/389 |
| 2013/0041282 A1 | | 2/2013 | Park et al. | |

FOREIGN PATENT DOCUMENTS

| | | |
|---|---|---|
| CN | 105118468 A | 12/2015 |
| CN | 209432893 U | 9/2019 |
| CN | 110772232 A | 2/2020 |
| CN | 112666397 A | 4/2021 |
| CN | 114720770 A | 7/2022 |
| EP | 3104936 B1 | 11/2019 |

OTHER PUBLICATIONS

Huaqiang Electronic Network; RC sine wave oscillator; http://news.hqew.com/info-338904; Jan. 23, 2019; 2 Pgs.

European Search Report of Corresponding Application No. EP22216992; Aug. 31, 2023; 4 Pgs.

\* cited by examiner

EEG IMPEDANCE TEST CIRCUIT, METHOD, AND DEVICE

CROSS-REFERENCE TO RELATED APPLICATION

This application claims the priority and benefit of Chinese patent application No. 202210972024.8, filed on Aug. 12, 2022. The entirety of Chinese patent application No. 202210972024.8 is hereby incorporated by reference herein and made a part of this specification.

TECHNICAL FIELD

The present application relates to the technical field of EEG detection, and more particularly to an EEG impedance test circuit, a method, and a device.

BACKGROUND ART

An electroencephalogram (EEG) is an examination technology that detects and records electrical activities in a brain enabling noninvasive measurement of brain activities. Before a signal is collected by an EEG, an electrode configured for the collection is attached to a scalp, and then relevant equipment is configured for the collection, so as to complete the corresponding detection, diagnosis, etc.

The premise of EEG signal collection is that the electrode configured for the collection has good contact with the scalp. Only in the case of good contact, can the collected signal be accurate, so as to obtain an accurate diagnostic result.

However, since a worker cannot make an accurate judgment as to whether the electrode is in good contact with the scalp, it can only be judged by the worker's own senses. There is an urgent need for a device or equipment capable of accurately judging whether the electrode is in good contact with the scalp.

SUMMARY

In order to accurately judge whether an electrode is in good contact with a scalp, the present application provides an EEG impedance test circuit, a method, and a device.

In the first aspect, an EEG impedance test circuit provided in the present application adopts the following technical solution:

an EEG impedance test circuit, comprising a frequency selecting circuit, an amplification circuit, a follower circuit, and a power supply terminal AVCC, wherein an input end of the frequency selecting circuit is connected to the power supply terminal AVCC, the input end of the frequency selecting circuit is also connected to the input end of the amplification circuit, an output end of the frequency selecting circuit is connected to the output end of the amplification circuit, and the output end of the amplification circuit is connected to the input end of the follower circuit;

the frequency selecting circuit is configured for oscillating so as to generate an oscillation signal;

the amplification circuit is configured for amplifying the oscillation signal;

the follower circuit is configured for isolating the frequency selecting circuit and the amplification circuit;

wherein the frequency of the oscillation signal does not comprise n*50 HZ, n is an integer greater than or equal to 1.

By adopting the above-mentioned technical solution, the following is performed: using a frequency selecting circuit to generate an oscillation signal of a required frequency, then using an amplification circuit to amplify the oscillation signal, using the isolation of a follower circuit to reduce the possibility of the frequency selecting circuit and the amplification circuit being affected, the oscillation signal being output from the follower circuit for testing, and testing the impedance between the electrode and the scalp, so as to judge whether the electrode is in good contact with the scalp according to the detected impedance without requiring a worker to judge according to his own senses, and using an accurate and quantifiable judgement method to reflect the contact condition between the electrode and the scalp by using the difference in impedance such that whether the contact is good can be judged more accurately. The frequency of the oscillation signal does not include n*50 HZ so as to reduce the possibility of being affected by the environment and interfering, thereby making the detection result more accurate.

Optionally, the frequency selecting circuit comprises a capacitor C1, a capacitor C3, a resistor R2, and a resistor R4; one end of the capacitor C1 is connected to the input end of the frequency selecting circuit, a resistor R1 is connected to the input end of the frequency selecting circuit, the other end of the resistor R1 is connected to the power supply terminal AVCC, the other end of the capacitor C1 is connected to the resistor R2, the other end of the resistor R2 is connected to the output end of the frequency selecting circuit, one end of the capacitor C3 is connected to the input end of the frequency selecting circuit, the other end of the capacitor C3 is connected to a ground end, the resistor R4 is connected in parallel with the capacitor C3, and a connection point of the capacitor C3 with the resistor R1 is connected to the input end of the frequency selecting circuit.

By using the above-mentioned technical solution, the frequency selecting circuit generates a required oscillation signal, so that the oscillation signal generated by the frequency selecting circuit is processed, and then an EEG test is performed.

Optionally, the amplification circuit comprises an operational amplifier U1A, a resistor R5, a resistor R8, a resistor R10, and a resistor R9; the output end of the operational amplifier U1A is connected to the resistor R8, the other end of the resistor R8 is connected to a negative input end of the operational amplifier U1A, the resistor R10 is connected in parallel with the resistor R8, and one end of the resistor R9 is connected to the power supply terminal AVCC; the other end of the resistor R9 is connected to the negative input end of the operational amplifier U1A, one end of the resistor R5 is connected to a ground end, and the other end of the resistor R5 is connected to the negative input end of the operational amplifier U1A.

By adopting the above-mentioned technical solution, the amplification circuit amplifies the oscillation signal generated by the frequency selecting circuit, so that the oscillation signal can meet the detection requirements.

Optionally, the amplification circuit further comprises a diode D1 and a diode D2, the diode D1 and diode D2 are arranged between the resistor R10 and the output end of the operational amplifier U1A, the resistor R10 is connected to a cathode end of the diode D1, an anode end of the diode D1 is connected to the output end of the operational amplifier U1A, the anode end of the diode D2 is connected to the cathode end of the diode D1, and the cathode end of the diode D2 is connected to the anode end of the diode D1.

By using the above-mentioned technical solution, and arranging the diode D1 and the diode D2 in the negative feedback loop of the amplification circuit, the oscillation amplitude can be adjusted. Since the diode is not conducted in the initial period of the oscillation, the operational amplifier U1A has no negative feedback, and can rapidly amplify the oscillation signal; subsequently, after the diode is conducted, the operational amplifier U1A starts to have negative feedback, so that the operational amplifier U1A outputs the required signal.

Optionally, the follower circuit comprises an operational amplifier U1B, a positive input end of the operational amplifier U1B is connected to the output end of the operational amplifier U1A, the output end of the operational amplifier U1B is connected to the negative input end of the operational amplifier U1B, and the output end of the operational amplifier U1B is connected to the output end of the follower circuit.

By using the above-mentioned technical solution, the operational amplification circuit and the subsequent output are isolated, thereby reducing the possibility that the operational amplification circuit and the oscillation circuit are affected.

Optionally, a bleeder circuit for adjusting a peak value of the oscillation signal is provided between the output end of the follower circuit and the output end of the operational amplifier U1B.

By adopting the above-mentioned technical solution, the bleeder circuit can change the peak value of the oscillation signal, so that the output oscillation signal can meet the detection requirements.

Optionally, the bleeder circuit comprises a resistor R3 and a resistor R6, wherein one end of the resistor R6 is connected to the output end of the operational amplifier U1B, the other end of the resistor R6 is connected to the output end of the follower circuit, one end of the resistor R3 is connected to the output end of the follower circuit, and the other end of the resistor R3 is connected to a power supply terminal Vref.

Optionally, impedance matching is performed on the routing of the frequency selecting circuit and packet ground is performed on two sides of the routing.

By adopting the above-mentioned technical solution, the impedance matching process can stabilize the waveform output by the frequency selecting circuit, and impedance consistency can be achieved by routing shield.

In the second aspect, the present application provides an EEG impedance circuit control method using the following technical solution:

an EEG impedance circuit control method applied to the EEG impedance test circuit of the first aspect, comprising:
generating an oscillation signal by an oscillation of a frequency selecting circuit;
amplifying the oscillation signal via an amplification circuit;
and isolating the frequency selecting circuit and the amplification circuit via a follower circuit;
wherein the input end of the frequency selecting circuit is connected to the power supply terminal AVCC, and the input end of the frequency selecting circuit is also connected to the input end of the amplification circuit; the output end of the frequency selecting circuit is connected to the output end of the amplification circuit, and the output end of the amplification circuit is connected to the input end of the follower circuit;
wherein the frequency of the oscillation signal does not comprise n*50 HZ, n is an integer greater than or equal to 1.

By adopting the above-mentioned technical solution, impedance matching processing is performed on routing, and impedance consistency can be achieved by routing shield on two sides of the routing, so as to reduce the possibility of the distortion of an oscillation signal.

In the third aspect, the present application provides an EEG impedance test device using the following technical solution:

an EEG impedance test device comprising the EEG impedance test circuit according to the first aspect.

In summary, the present application comprises at least one of the following beneficial technical effects.

1. Using a frequency selecting circuit to generate an oscillation signal of a required frequency, then using an amplification circuit to amplify the oscillation signal, using the isolation of a follower circuit to reduce the possibility of the frequency selecting circuit and the amplification circuit being affected, the oscillation signal being output from the follower circuit for testing, and testing the impedance between the electrode and the scalp, so as to judge whether the electrode is in good contact with the scalp according to the detected impedance without requiring a worker to judge according to his own senses, and using an accurate and quantifiable judgement method to reflect the contact condition between the electrode and the scalp by using the difference in impedance such that whether the contact is good can be judged more accurately. The frequency of the oscillation signal does not include n*50 HZ so as to reduce the possibility of being affected by the environment and interfering, thereby making the detection result more accurate;

2. By arranging diode D1 and diode D2 in the negative feedback loop of the amplification circuit, the oscillation amplitude can be adjusted. Since the diode is not conducted in the initial period of the oscillation, the operational amplifier U1A has no negative feedback, and can rapidly amplify the oscillation signal; subsequently, after the diode is conducted, the operational amplifier U1A starts to have negative feedback, so that the operational amplifier U1A outputs the required signal.

DETAILED DESCRIPTION

Figure 1:
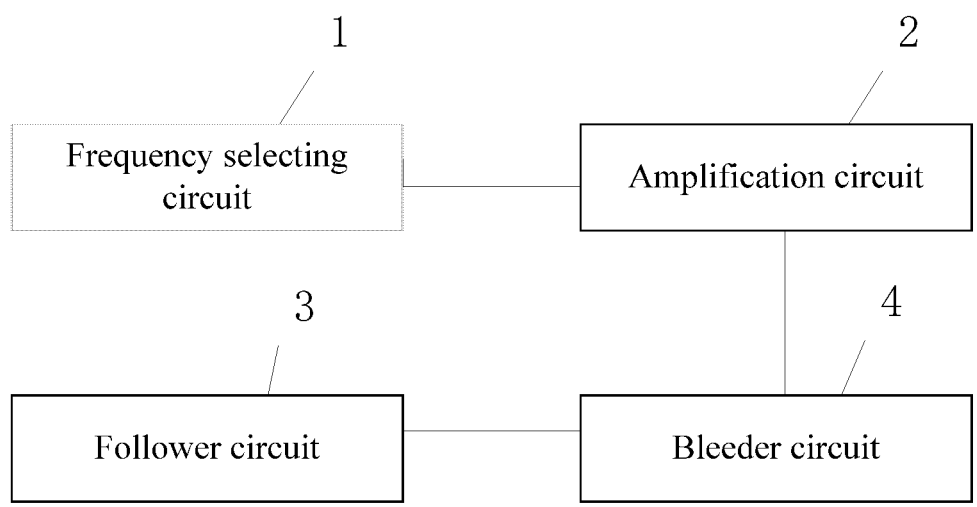
FIG. 1 is a block diagram of an overall connection of an embodiment.

The present application is described in further detail below with reference to FIGS. 1 and 2 and embodiments. It is to be understood that the specific embodiments described herein are merely illustrative of the present application and are not intended to be limiting thereof.

An embodiment of the present application discloses an EEG impedance test circuit. Referring to FIG. 1, an EEG impedance test circuit includes a frequency selecting circuit 1, an amplification circuit 2, a follower circuit 3, and a power supply terminal AVCC. An input end of the frequency selecting circuit 1 is connected to the power supply terminal AVCC, the input end of the frequency selecting circuit 1 is further connected to the input end of the amplification circuit 2, an output end of the frequency selecting circuit 1 is connected to the output end of the amplification circuit 2, the output end of the amplification circuit 2 is connected to the input end of the follower circuit 3, and the output end of the follower circuit 3 is configured for connecting a part to be tested.

The frequency selecting circuit 1 outputs an oscillation signal to the amplification circuit 2, and performs feedback via a feedback end of the frequency selecting circuit 1, so that the frequency selecting circuit 1 gradually reaches stability from the waveform frequency instability in the oscillation starting stage, and then outputs a stable oscillation signal. At the same time, the amplification circuit 2 amplifies the oscillation signal, the amplified oscillation signal is transmitted to the follower circuit 3, the output end of the follower circuit 3 is configured for connecting a part to be tested, the follower circuit 3 plays an isolation role, and the follower circuit 3 can isolate the frequency selecting circuit 1 from the amplification circuit 2, thereby reducing the possibility that the part to be tested affects the stability of the oscillation signal.

The EEG impedance test circuit further comprises a power supply terminal Vref. The power supply terminal AVCC and the power supply terminal Vref are configured for providing different voltage values. The power supply terminal AVCC is connected to a capacitor C2, the other end of the capacitor C2 is connected to a ground end, and the capacitor C2 is configured for filtering. The power supply terminal Vref is used to provide a voltage of 1.5V, and the power supply terminal AVCC is used to provide a voltage of 3V.

Figure 2:
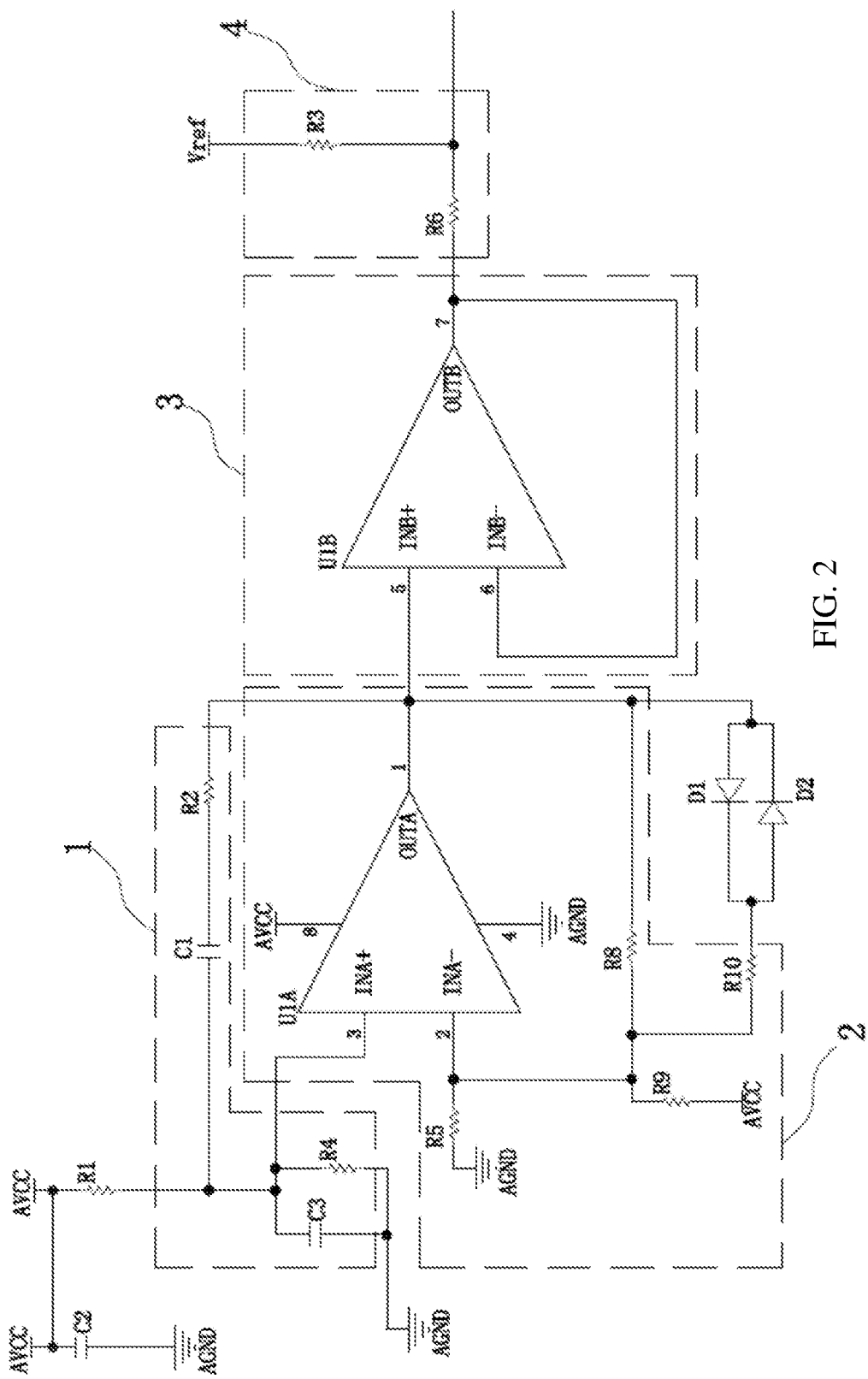
FIG. 2 is a schematic diagram of an overall circuit of an embodiment of the present application.

With reference to FIG. 2, the frequency selecting circuit 1 comprises a capacitor C1, a capacitor C3, a resistor R2, and a resistor R4. One end of the capacitor C1 is connected to the input end of the frequency selecting circuit 1, the input end of the frequency selecting circuit 1 is connected to the resistor R1, the other end of the resistor R1 is connected to the power supply terminal AVCC, the other end of the capacitor C1 is connected to the resistor R2, the other end of the resistor R2 is connected to the output end of the frequency selecting circuit 1, the capacitor C3 is connected to a connection point between the resistor R1 and the capacitor C1, and the other end of the capacitor C3 is connected to a ground end; the resistor R4 is connected in parallel with the capacitor C3, and the connection point of the capacitor C3 with the resistor R1 is connected to the input end of the frequency selecting circuit 1.

Voltage division is performed via the resistor R1 and the resistor R4 so as to obtain a voltage of 1.5V, namely, the input end of the frequency selecting circuit 1 is connected to a voltage of 1.5V.

Referring to FIG. 2, in the present embodiment, since the frequency of the electroencephalogram is between 0.5 HZ and 40 HZ, the frequency of the oscillation signal generated by the frequency selecting circuit 1 designed in the present embodiment is between 40 HZ and 128 HZ, and the frequency of the oscillation signal cannot be n*50 HZ, n is an integer greater than or equal to 1. The definition of 128 HZ is obtained according to the sampling rate. Since the sampling rate in the detection of this embodiment is 256 HZ, it will do as long as it can be concluded that the frequency of the oscillation signal is less than 128 HZ according to Nyquist theorem. If the sampling rate is changed, the defined frequency will also change correspondingly, and will not be described herein.

The amplification circuit 2 comprises an operational amplifier U1A, a resistor R5, a resistor R8, a resistor R10, and a resistor R9. The output end of the operational amplifier U1A is connected to the resistor R8, the other end of the resistor R8 is connected to the negative input end of the operational amplifier U1A, one end of the resistor R10 is connected to the negative input end of the operational amplifier U1A, the other end of the resistor R10 is connected to a diode D1, the anode end of the diode D1 is connected to the output end of the operational amplifier U1A, and the diode D1 is connected in parallel to a diode D2; the anode end of the diode D2 is connected to the cathode end of the diode D1, the cathode end of the diode D2 is connected to the anode end of the diode D1, one end of the resistor R9 is connected to the power supply terminal AVCC, the other end of the resistor R9 is connected to the negative input end of the operational amplifier U1A, one end of the resistor R5 is connected to the negative input end of the operational amplifier U1A, and the other end of the resistor R5 is connected to the ground end. The anode of the operational amplifier U1A is connected to the power supply terminal AVCC, and the cathode of the operational amplifier U1A is connected to the ground end.

The follower circuit 3 comprises an operational amplifier U1B. In this embodiment, the operational amplifier U1B is integrated with the operational amplifier U1A, so that the manner in which the anode and cathode of the operational amplifier U1A are connected represent the manner in which the anode and cathode of the operational amplifier U1B are connected, and it does not need to be drawn again on the circuit diagram. The positive input end of the operational amplifier U1B is connected to the output end of the operational amplifier U1A, the output end of the operational amplifier U1B is connected to the negative input end of the operational amplifier U1B, and the output end of the operational amplifier U1B is connected to a bleeder circuit 4.

The bleeder circuit 4 comprises a resistor R3 and a resistor R6. One end of the resistor R6 is connected to the output end of the operational amplifier U1B, the other end of the resistor R6 is connected to the output end of the follower circuit 3, one end of the resistor R3 is connected to the power supply terminal Vref, and the other end of the resistor R3 is connected to the output end of the follower circuit 3.

Referring to FIG. 2, the resistor R3 and the resistor R6 play a voltage dividing role in adjusting the peak value of the output sinusoidal signal, i.e. the peak value of the oscillation signal is adjusted so that the output signal can meet the test requirements.

When the circuit is routed on a circuit board, increasing impedance is performed on the frequency selecting circuit. In this embodiment, the impedance of 50Q is added, so that the output oscillation signal meets the test requirements. Impedance matching is performed on the routing of the frequency selecting circuit, and the routing is shielded on two sides of the routing, so that the impedances are kept consistent and the possibility of the distortion of the oscillation signal is reduced.

The implementation principle of an EEG impedance test circuit in the embodiment of the present application is as follows: the frequency selecting circuit 1 starts oscillation after being powered on, and feedback is realized through a feedback end, so as to gradually reach a stable oscillation state, namely, a stable oscillation signal can be output; the amplification circuit 2 amplifies the oscillation signal, and then the follower circuit 3 plays an isolation role so as to reduce the possibility that the post-stage circuit affects the pre-stage circuit, namely, the possibility that the oscillating circuit and the amplification circuit 2 are affected is reduced.

The signal output by the follower circuit 3 is used to detect the impedance between the electrode and the scalp, and a worker can judge the contact condition between the electrode and the scalp according to the value of the impedance, thereby judging whether the contact is good. Furthermore, the subjective judgments of the worker according to his own senses are reduced, and the judgment can be more accurate by using the detected impedance.

The diode D1, the diode D2, and the resistor R10 play a regulating role; when the oscillation signal is small, the two diodes are not conductive, so there is no feedback function; it can be understood that the circuit branches of the diode D1, the diode D2, and the resistor R10 do not exist, and only the resistor R8 is conductive; under the positive feedback function, the oscillation signal output by the output end of the operational amplifier U1A is rapidly increased, namely, the voltage rapidly increases; when the oscillation signal is large, the two diodes are gradually conductive, and at this time, the resistor R10 and the resistor R8 are connected in parallel, and the enlargement factor of the operational amplifier U1A decreases; therefore, the effect of adjusting the oscillation amplitude of the oscillation signal is achieved. In combination with the bleeder circuit 4, the amplitude of the output oscillation signal is better regulated so as to obtain an oscillation signal meeting the test requirements.

An embodiment of the present application discloses an EEG impedance circuit control method. The EEG impedance circuit control method comprises:
  generating an oscillation signal by the oscillation of a frequency selecting circuit;
  amplifying the oscillation signal via an amplification circuit;
  and isolating the frequency selecting circuit and the amplification circuit via a follower circuit;
  wherein an input end of the frequency selecting circuit is connected to a power supply terminal AVCC, the input end of the frequency selecting circuit is also connected to the input end of the amplification circuit; an output end of the frequency selecting circuit is connected to the output end of the amplification circuit, and the output end of the amplification circuit is connected to the input end of the follower circuit;
  wherein the frequency of the oscillation signal does not include n*50 HZ, n is an integer greater than or equal to 1.

An embodiment of the present application discloses an EEG impedance test device. The EEG impedance test device includes an EEG impedance test circuit. By using the EEG impedance test circuit, a signal for detecting the impedance can be output, and this signal is less affected by the outside world and has high stability.

The above are preferred embodiments of the application, and the scope of protection of the application is not limited accordingly. Unless otherwise specified, any feature disclosed in the description (including the abstract and drawings) can be replaced by other equivalent alternative features or alternative features having similar purposes. That is, unless particularly stated otherwise, each feature is only one example of a series of equivalent or similar features.

What is claimed is:

1. An electroencephalogram (EEG) impedance test circuit, comprising: a frequency selecting circuit, an amplification circuit, a follower circuit, and a power supply terminal, wherein, an input end of the frequency selecting circuit is connected to the power supply terminal, the input end of the frequency selecting circuit is further connected to an input end of the amplification circuit, an output end of the frequency selecting circuit is connected to an output end of the amplification circuit, and the output end of the amplification circuit is connected to an input end of the follower circuit;
  the frequency selecting circuit is configured for oscillating to generate an oscillation signal;
  the amplification circuit is configured for amplifying the oscillation signal; and
  the follower circuit is configured for isolating the frequency selecting circuit and the amplification circuit;
  wherein a frequency of the oscillation signal does not comprise n*50 HZ, n is an integer greater than or equal to 1.

2. The EEG impedance test circuit according to claim 1, wherein, the frequency selecting circuit comprises a first capacitor, a second capacitor, a first resistor, and a second resistor; one end of the first capacitor is connected to the input end of the frequency selecting circuit, a third resistor is connected to the input end of the frequency selecting circuit, an end of the third resistor is connected to the power supply terminal, a second end of the first capacitor is connected to the first resistor, an end of the first resistor is connected to the output end of the frequency selecting circuit, one end of the second capacitor is connected to the input end of the frequency selecting circuit, a second end of the second capacitor is connected to a ground end, the second resistor is connected in parallel with the second capacitor, and a connection point of the second capacitor with the third resistor is connected to the input end of the frequency selecting circuit.

3. The EEG impedance test circuit according to claim 1, wherein, the amplification circuit comprises an operational amplifier, a first resistor, a second resistor, a third resistor, and a fourth resistor; an output end of the operational amplifier is connected to the second resistor, an end of the second resistor is connected to a negative input end of the operational amplifier, the third resistor is connected in parallel with the second resistor, and an end of the fourth resistor is connected to the power supply terminal; a second end of the fourth resistor is connected to the negative input end of the operational amplifier, one end of the first resistor is connected to a ground end, and a second end of the first resistor is connected to the negative input end of the operational amplifier.

4. The EEG impedance test circuit according to claim 3, wherein, the amplification circuit further comprises a first diode and a second diode, the first diode and the second diode are arranged between the third resistor and the output end of the operational amplifier, the third resistor is connected to a cathode end of the first diode, an anode end of the first diode is connected to the output end of the operational amplifier, an anode end of the second diode is connected to the cathode end of the first diode, and a cathode end of the second diode is connected to the anode end of the first diode.

5. The EEG impedance test circuit according to claim 1, wherein, the follower circuit comprises a first operational amplifier, a positive input end of the first operational amplifier is connected to an output end of a second operational amplifier, an output end of the first operational amplifier is connected to a negative input end of the first operational amplifier, and the output end of the first operational amplifier is connected to an output end of the follower circuit.

6. The EEG impedance test circuit according to claim 5, wherein, a bleeder circuit for adjusting a peak value of the oscillation signal is provided between the output end of the follower circuit and the output end of the first operational amplifier.

7. The EEG impedance test circuit according to claim 6, wherein, the bleeder circuit comprises a first resistor and a second resistor, wherein one end of the second resistor is connected to the output end of the first operational amplifier, a second end of the second resistor is connected to the output end of the follower circuit, one end of the first resistor is connected to the output end of the follower circuit, and a second end of the first resistor is connected to a second power supply terminal.

8. The EEG impedance test circuit according to claim 1, wherein, impedance matching is performed on a routing of the frequency selecting circuit and the routing is shielded on two sides of the routing.

9. An EEG impedance circuit control method, which is applied to the EEG impedance test circuit according to claim 1, comprising:

generating the oscillation signal by an oscillation of the frequency selecting circuit;

amplifying the oscillation signal by the amplification circuit; and isolating the frequency selecting circuit and the amplification circuit with the follower circuit;

wherein the input end of the frequency selecting circuit is connected to the power supply terminal, and the input end of the frequency selecting circuit is also connected to the input end of the amplification circuit; the output end of the frequency selecting circuit is connected to the output end of the amplification circuit, and the output end of the amplification circuit is connected to the input end of the follower circuit; and wherein the frequency of the oscillation signal does not comprise n*50 HZ, n is an integer greater than or equal to 1.

10. An EEG impedance test device, comprising: the EEG impedance test circuit according to claim 1.

* * * * *